E. R. & W. E. SMITH & J. J. WEIER.
FRAME SUSPENSION FOR MOTOR VEHICLES.
APPLICATION FILED MAR. 14, 1910.
1,039,329.
Patented Sept. 24, 1912.
2 SHEETS—SHEET 2.
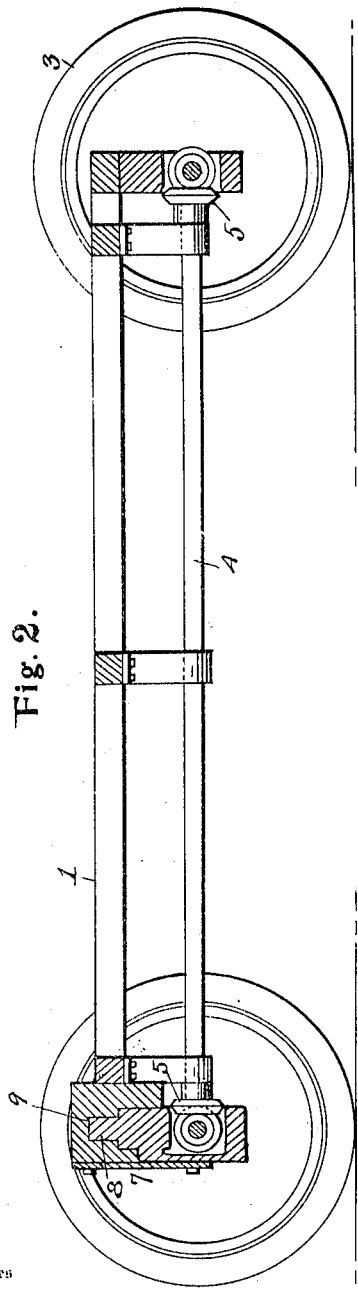
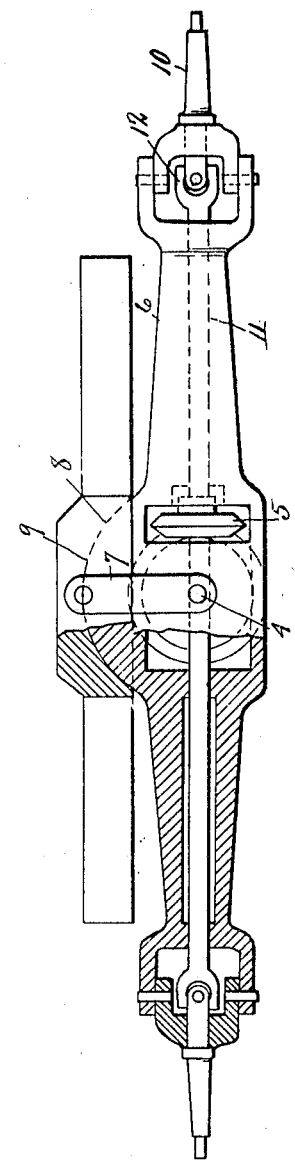
Witnesses
O. B. Baenziger.
C. C. Jennings
Inventors
Edward R. Smith,
William E. Smith,
John J. Weier.
Parker & Burton Attorneys

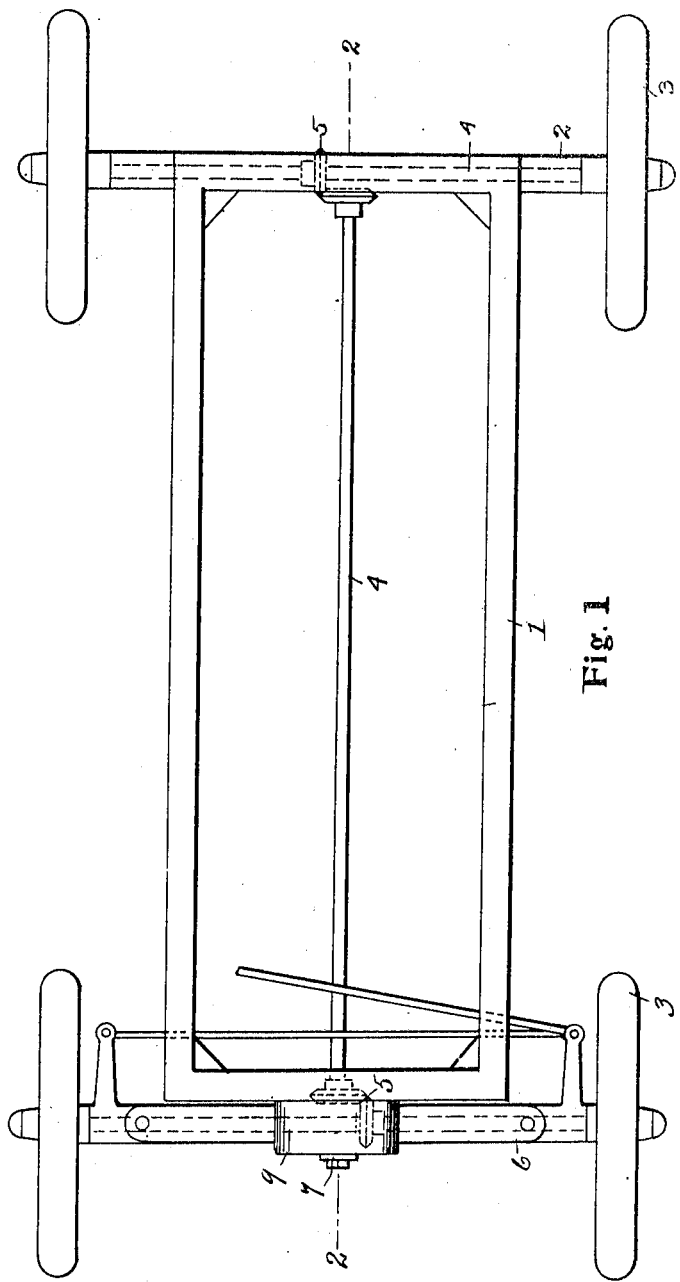

UNITED STATES PATENT OFFICE.

EDWARD R. SMITH, WILLIAM E. SMITH, AND JOHN J. WEIER, OF BIRMINGHAM, MICHIGAN.

FRAME SUSPENSION FOR MOTOR-VEHICLES.

1,039,329.  Specification of Letters Patent. Patented Sept. 24, 1912.

Application filed March 14, 1910. Serial No. 549,340.

*To all whom it may concern:*

Be it known that we, EDWARD R. SMITH, WILLIAM E. SMITH, and JOHN J. WEIER, who are citizens of the United States, residing at Birmingham, county of Oakland, State of Michigan, have invented a certain new and useful Improvement in Frame Suspensions for Motor-Vehicles, and declare the following to be a full, clear, and exact description of the same, such as will enable others skilled in the art to which it pertains to make and use the same, reference being had to the accompanying drawings, which form a part of this specification.

This invention relates to suspension frames for automobiles, and has for its object an improved device of this type adapted to maintain the desired position of the supporting frame of the body of the vehicle, regardless of the inequalities of the road over which the wheels are passing.

In the drawings:—Figure 1, is a plan view of the frame and running wheels of the device. Fig. 2, is a side elevation partly in section showing the relation of the power shaft to the frame-supporting means. Fig. 3, is an elevation partly in section showing the details of the suspension means.

1 indicates the frame of the vehicle, which is supported at the rear upon axle casing 2 and traction wheels 3, and at the front upon the axle casing 6. Power is transmitted to the axles in each of the axle casings by the shaft 4 (connected with a motor not shown) and friction disks 5. At the front, the hood-supporting platform extends over the front axle casing 6 and is held in sliding engagement with the arched body or saddle 8 of the front axle casing. This engagement is effected by the arched and stepped saddle portion fitting into a complementarily recessed portion 9 of the hood-supporting platform; the link 7, which is pivotally fastened to the saddle portion at a point centric to the curvature of the arch, is attached at its other end to the hood-supporting platform. In this construction it is seen that only the center portion 9 of the hood-supporting platform is in contact with the axle casing. This single point suspension of the frame at the front combined with the suspension of the frame at the rear at both sides by means of springs or otherwise, is sufficient to provide for its balance under ordinary circumstances, when the wheels are running along an even section of road; and when either wheel is lowered because of inequalities in the level of the road that corner of the forward end of the frame being correspondingly tilted, it is maintained in nearly horizontal position by its sliding engagement upon the saddle portion of the axle casing and is restrained from possible separation therefrom by the link 7, thus effecting a three-point suspension of the frame regardless of the irregularities of the road.

The hub portions 10 of the wheel-supporting means are connected to the power shaft 11 by knuckle joints 12, but as neither of these features form a part of this invention, they are not here described in detail.

What we claim is:—

In combination with the axle of a vehicle, having intermediate its ends a connection with a source of power, a casing inclosing said axle, and provided with a central portion in the form of a hollow saddle, having an arched stepped hollow surface and inclosing the devices connecting said axle to the source of power, a hood-supporting platform having mid-way its ends a concavity complementary in curvature and stepped structure to that on the upper surface of said saddle and slidably mounted thereon, a radius arm at one end pivotally attached to said casing at a point centric to the arch of said saddle portion and at the other end pivoted to the hood-supporting platform, substantially as described.

In testimony whereof, we sign this specification in the presence of two witnesses.

EDWARD R. SMITH.
WILLIAM E. SMITH.
JOHN J. WEIER.

Witnesses:
WILLIAM M. SWAN,
ELLIOTT J. STODDARD.